June 15, 1965 G. G. HEBARD 3,189,036
FLUID METERING

Filed May 28, 1963 3 Sheets-Sheet 1

INVENTOR.
G.G. HEBARD
BY
ATTORNEYS

June 15, 1965 G. G. HEBARD 3,189,036
FLUID METERING
Filed May 28, 1963 3 Sheets-Sheet 2

INVENTOR.
G.G. HEBARD
BY Young & Quigg
ATTORNEYS

June 15, 1965         G. G. HEBARD                3,189,036
                      FLUID METERING
Filed May 28, 1963                          3 Sheets-Sheet 3

INVENTOR.
G.G. HEBARD
BY
    ATTORNEYS

United States Patent Office

3,189,036
Patented June 15, 1965

3,189,036
FLUID METERING
Glen G. Hebard, Bartlesville, Okla., assignor to Phillips
Petroleum Company, a corporation of Delaware
Filed May 28, 1963, Ser. No. 283,851
4 Claims. (Cl. 137—2)

This invention relates to fluid metering. In one aspect the invention relates to a method for metering a fluid and transferring custody thereof. In another aspect this invention relates to apparatus for metering a fluid and transferring custody thereof.

In utilizing unattended, automatic lease oil metering and custody transfer equipment it is important to obtain accurate metering, to discontinue custody transfer when an unacceptable fluid product is produced, and to prevent unmetered interchange between fluid still in the custody of the producer and fluid which has passed into the hands of and been charged to the purchaser. Positive displacement metering tanks have proved to be completely satisfactory both from the standpoint of reliability and accuracy in lease automatic custody transfer systems (LACT). Unmetered interchange has been prevented by electrical interlocks in the actuating system for the various control valves.

An object of my invention is to provide improved fluid metering.

Another object of my invention is to provide an improved method and apparatus for fluid metering and automatic custody transfer.

Another object of my invention is to prevent unmetered interchange in a positive displacement metering tank type of LACT system without expensive electrical or electronic interlocks.

Other aspects, objects and the advantages of my invention are apparent in the written description, the drawing and the claims.

According to my invention unmetered interchange in a positive displacement meter custody transfer system is prevented by utilizing a three-way valve which provides two alternate flow paths, one between an accumulation chamber and the metering chamber and the other between the metering chamber and the custody transfer chamber, only one of the paths being open at one time, and both of the paths being capable of being closed simultaneously.

Further according to my invention there is provided a method for metering and transferring custody of a fluid by transferring fluid from an accumulation zone to a metering zone through a first path of a transfer zone, closing the first path and opening the second path through the transfer zone when the fluid in the metering zone reaches a predetermined level, thereby discontinuing transfer of fluid from the accumulation zone to the metering zone and beginning transfer of fluid from the metering zone to a custody transfer zone, and closing the first path and opening the second path after the metering chamber has emptied into the custody transfer zone.

In the drawing, FIGURE 1 illustrates a combination vessel containing an accumulation chamber, a metering chamber and a custody transfer chamber and associated equipment.

Figure 1:
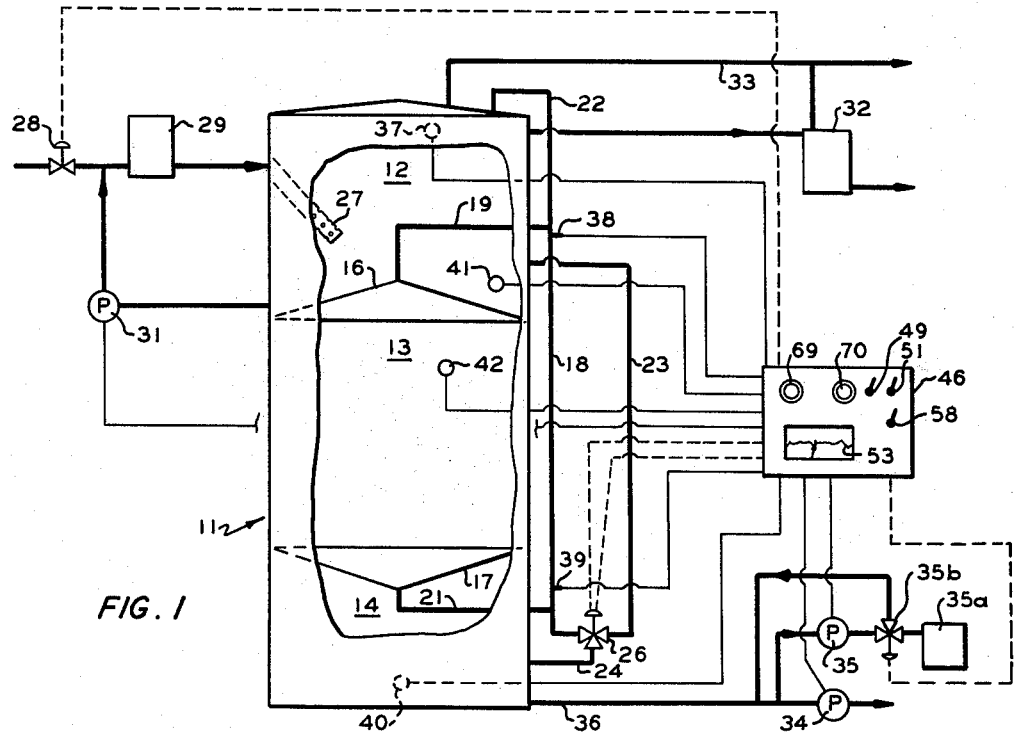

In FIGURE 1 tank 11 comprises an upper accumulation chamber 12, an intermediate metering chamber 13 and a lower custody transfer chamber 14. Conical barriers 16 and 17 separate the accumulation chamber 12 from metering chamber 13 and metering chamber 13 from custody transfer chamber 14. A vertical pipe 18 is connected with metering chamber 13 at its upper end through a pipe 19 and at its lower end with a pipe 21. The pressure in chambers 12 and 13 is equalized by a vapor connection 22. A vertical pipe 23 is connected with accumulation chamber 12 at a point substantially above the bottom thereof as illustrated. Vertical pipes 18 and 23 and a pipe 24 are all connected with a three-way motor valve 26, described more fully in connection with FIGURE 3. A perforated inlet pipe 27 enters accumulation chamber 12.

Tank 11 and associated equipment are used in combination with other items of equipment which individually are known in the art of petroleum production. For example, the fluid produced from the wells is passed through a lease shutoff valve 28 and treating equipment represented schematically at 29. This equipment includes those items necessary to prepare the liquid for delivery to a pipeline, including for example settling, dehydration and gas separation. A circulating pump 31 is provided to recirculate fluid being accumulated in chamber 12 to prevent the buildup therein of unacceptable liquid. Preferably the fluid recirculates through the settling and dehydration means. An overflow tank 32 is provided and connected with the upper portion of accumulation chamber 12. A vent line 33 is connected with chamber 12 and tank 32. Pipeline pump 34 is connected with chamber 14 through pipe 36. The outlet of a sampling pump 35 connects with a sample tank 35a and with pipe 36 from which it also draws suction. A three way valve 35b controls the outlet to tank 35a from pipe 36.

Liquid level detectors 37, 38, 39 and 40 are provided as shown. Detector 37 is near the top of chamber 12. Detector 38 is at a point in pipe 18 somewhat above the outlet from chamber 12 of pipe 23, about one foot being a satisfactory distance, marking the upper boundary of metering chamber 13 which thus extends upward within the vertical portion of pipe 19 to the level of detector 38. Detector 39 is at a point below cone 17 and above valve 26 which is the lower boundary of chamber 13. Detector 40 communicates with custody transfer chamber 14 near the bottom thereof. In the embodiment illustrated level detectors 37, 38, 39 and 40 are float actuated switches.

A capacitance operated level detector 41 is provided in chamber 12, above the connection for pump 31 but below the connection with pipe 23, and serves to detect an excess of water in the oil. A suitable instrument is a Model B-07-FS Electro-O-Probe made by Instruments, Inc., which forms a capacitor between the electrode and the vessel wall, the surrounding media being the dielectric. An oscillator circuit includes this capacitor and, if the moisture content rises above a predetermined minimum, there is a sufficient change in capacity to kill the oscillator causing a relay to be operated.

A temperature probe 42 also is provided.

Figure 2:
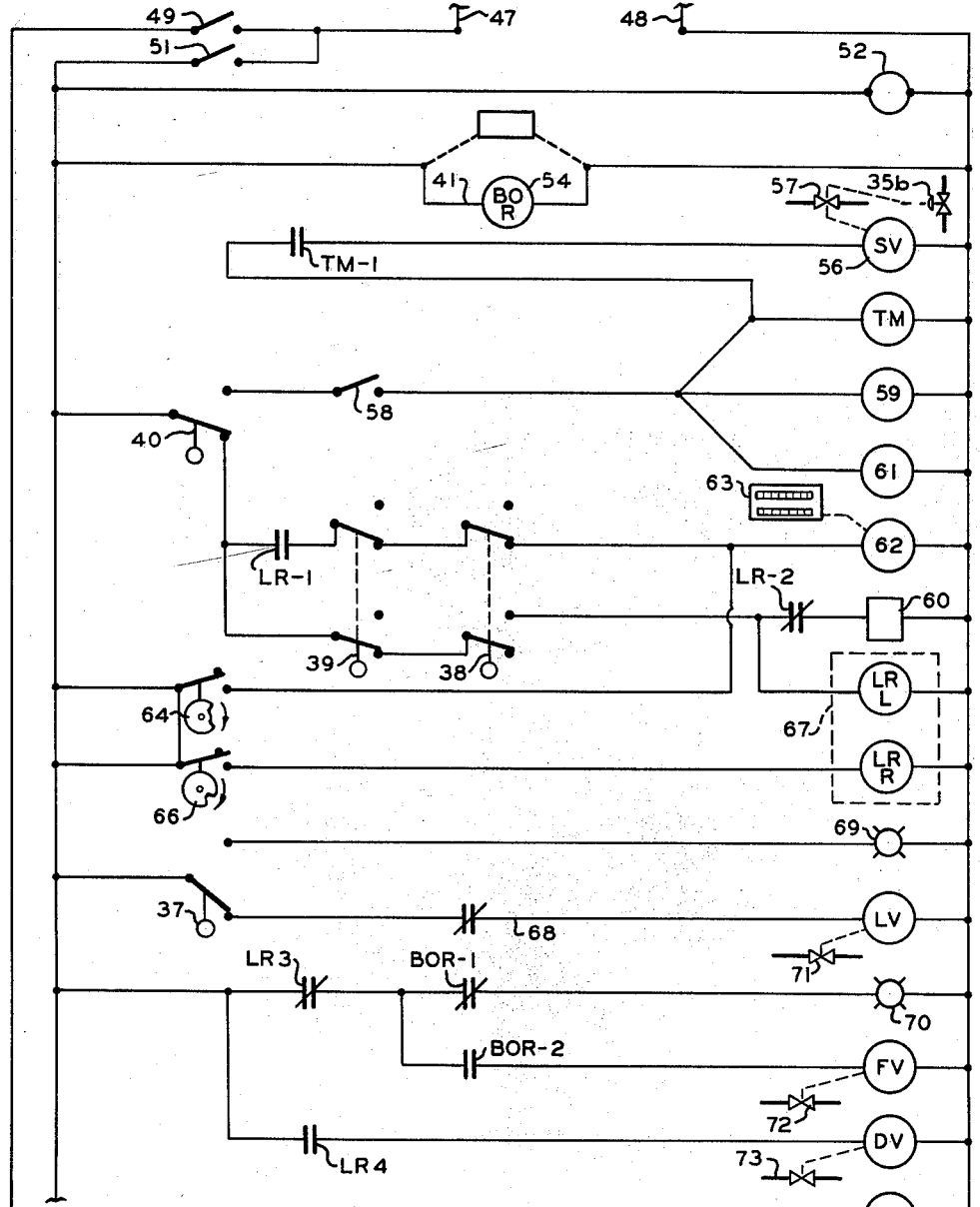
FIGURE 2 is a circuit diagram of an electrical system for the apparatus of FIGURE 1.

The various items of equipment are connected with a control apparatus 46, the circuits of which are illustrated schematically in FIGURE 2. Conductors 47 and 48 supply a connection with a 115-volt A.C. source of electrical power. Switch 49 controls a circuit to the motor starter 50 for the motor of circulating pump 31. Switch 51 is a master switch for the control circuit. A motor 52 drives a chart 53 (see FIGURE 1) for recording the temperature continuously. The capacitance operated level detector 41 is connected as shown and the coil 54 of a bad oil relay (BOR) which is deenergized when the oscillator ceases to oscillate is connected therein.

A solenoid 56 actuates a valve 57 which supplies air to motor valve 35b. It is in a circuit which includes the contacts TM–1 of a timer TM. Timer TM provides one contact closure at TM–1 each two minutes when the circuit to timer TM is completed through sample switch 58 and liquid level detector 40. Also completed through switch 58 and detector 40 is the circuit to the starter 59 for sample pump 35 and to starter 61 for pipeline pump 34. Level detectors 38 and 39 are provided with double-pole double-throw switches as illustrated. One set of contacts of these detectors controls the circuit to dump counter motor 62 which rotates the counter 63 and the cams 64 and 66. Counter 63 as illustrated includes two separate counting heads, one to total the number of revolutions of motor 62 which, as will be apparent from the complete description, represents the number of deliveries made, each delivery representing the volume of metering chamber 13, and the other being a preset head which subtracts one for each revolution of motor 62 and which is used to actuate a switch 68 to disconnect the actuating circuit and thus close the shutoff valve 28 to discontinue operation when the lease allowable has been produced. The circuit to dump counter motor 62 also includes the contacts LR–1 of a latching relay 67 which includes latching coil LRL and releasing coil LRR. Normally closed contacts LR–2 are connected with temperature averaging means 60 to provide one pulse thereto each time the circuit is completed. Cams 64 and 66 are rotated by dump counter motor 62. When the slot of cam 66 reaches its corresponding cam follower, the contacts actuated thereby are released thus completing a circuit to releasing coil LRR which causes contacts LR–1 to open and LR–2 to close. Simultaneously the follower of cam 64 falls into the slot in this cam thus maintaining a complete circuit to motor 62 which continues to run to complete the revolution, that is until cam 64 reaches the end of its slot, at which time its associated contact is lifted thus stopping the motor, the cams being in position for another cycle of operation. Level detector 37 normally is in the down position thus completing the circuit through the contacts 68 of counter 63 through a coil LV which actuates the lease valve 28 to maintain it open. Actuation of the valve can be by direct electrical solenoid or motor or by solenoid-actuated air supply, etc. When the level in chamber 12 rises to the height of detector 37, the circuit to lease valve 28 is interrupted thus allowing valve 28 to close and at the same time completing the circuit through lease shut-in light 69 indicating the cause for the shutdown. As illustrated, LV actuates a valve 71 which supplies air to the motor of valve 28.

As long as the capacitance circuit associated with the capacitance operated level detector 41 is oscillating, bad oil relay 54 is operative and normally closed contacts BOR–1 are open and normally open contacts BOR–2 are closed. Normally closed contacts LR–3 are closed when latching relay 67 is in the released position, completing a circuit through coil FV which actuates a solenoid valve 72 to supply air to the space above the diaphragm of valve 26. When relay 67 is in the latched position contacts LR–3 are open and contacts LR–4 are closed, completing a circuit through the coil DV, actuating valve 73 to supply air to the bottom side of the diaphragm of valve 26. When BOR 54 is deenergized by detector 41, contacts BOR–2 open to permit valve 26 to close when LR–4 are open, and BOR–1 are closed to energize light 70 when LR–3 are closed. Oil already in metering chamber 13 and custody transfer chamber 14 is transferred, but operations cease when relay 67 is released.

Figure 3:
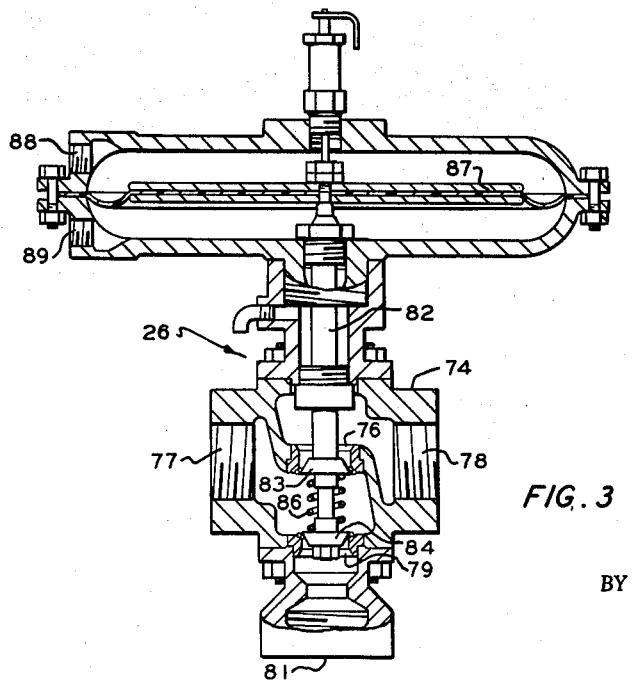
FIGURE 3 is a vertical cross section of a valve of FIGURE 1.

As shown in FIGURE 3, valve 26 comprises a body 74 having a port 76 which controls the flow path from opening 77 to opening 78, and a port 79 controlling the path from opening 77 to opening 81. A rod 82 slidably supports a pair of valve discs 83 and 84 which are spaced apart by a spring 86. The upper end of rod 82 is attached to diaphragm 87. Air can be supplied to the space above diaphragm 87 through inlet 88, and to the space below diaphragm 87 through inlet 89. When air is supplied to the space above diaphragm 87, rod 82 is pushed down, forcing disc 83 from its seat, disc 84 sliding on rod 82 to permit the rod to be lowered. This establishes a flow path extending between opening 77 and opening 78. As air is released from above diaphragm 87, when it returns to central position, both discs are seated, closing both passageways. If air is then supplied to the space beneath diaphragm 87, disc 84 is lifted from its seat in port 79, establishing a second flow path extending between openings 77 and 81. Opening 77 is connected with the lower end of pipe 18, opening 78 with the lower end of pipe 23 and opening 81 with the pipe 24.

In operation, with switches 49, 51 and 58 closed, normally valve 28 is open, the level of liquid in chamber 12 being below detector 37, and fluid flows from the wells of the lease through treating equipment 29, and perforated inlet pipe 27, into chamber 12. During this period contacts LR–3 and BOR–2 are closed and air is supplied to valve 26 above diaphragm 87, opening a flow path between openings 77 and 78 allowing flow from chamber 12 through pipe 23 and valve 26 through pipe 21 into metering chamber 13. This continues until the level rises above cone 16, at which time the level rises rapidly until it passes the height of the connection of pipe 23 with chamber 12, after which it rises slowly as it fills chamber 12 until the level reaches detector 38. Detector 39 will previously have been wet and at this time the contacts of both 39 and 38 are in the up position. Since detector 40 is uncovered, a circuit is completed through detectors 38, 39 and 40 to LRL thus latching relay 67. This opens contacts LR–2 and LR–3 and closes contacts LR–1 and LR–4. The closing of contacts LR–1 has no effect with either of detectors 38 and 39 in the up or wet position. Opening contacts LR–3 and closing contacts LR–4 removes pressure from above diaphragm 87 of valve 26 and supplies pressure below the diaphragm, switching the valve to close the flow path between openings 77 and 78 and to open the flow path between openings 77 and 81, permitting flow of oil to begin by gravity from chamber 13 to chamber 14, through pipe 24. Detector 40 shortly thereafter is wet by liquid, breaking the circuit through LR–1 and completing the circuit through switch 58 to the timer motor and coils 59 and 61. Coils 59 and 61 start pipeline pump 34 and sample pump 35, respectively, and timer motor TM completes a circuit by closing contacts TM–1 periodically to actuate the coil 56 which opens the valve 57 to supply air to valve 35b, periodically pumping a sample into sample tank 35a. This operation continues until the level falls below detector 39, at which time it again assumes normal position as illustrated in FIGURE 2, and until the level falls below detector 40. When this occurs, the circuit through the timer motor and pump starters is broken, stopping pumps 34 and 35 and the operation of sample valve 35b, and completing the circuit through detector 40, the now closed contacts LR–1, and the upper pole of detectors 38 and 39, through dump counter motor 62. As dump counter motor 62 turns, cams 64 and 66 are turned. When the slot in 66 reaches its associated cam follower, the corresponding switch is closed, completing the circuit to LRR to unlatch relay 67. Simultaneously the follower falls into the slot of cam 64 which maintains the circuit to dump counter motor 62 complete even though the contacts LR-1 are now open, causing the motor to drive the cam 66 until the follower leaves the slot. This opens the circuit to LRR. The circuit to motor 62 is broken by cam 64 a short time later and motor 62 has completed one revolution. The totalizing counter of counter 63 adds one to the total count and subtracts one from the total of the preset counter. When relay 67 returns to the unlatched position, contacts LR-3 close and contacts LR-4 open, reversing the position of valve 26 to continue another cycle of operation.

If at any time during the operation, detector 41 senses oil having a water content too high to be acceptable, BOR is deenergized closing contacts BOR-1 and opening contacts BOR-2. If the system is in operation such that oil is being circulated from chamber 12 to chamber 13, the operation immediately ceases since both BOR-2 and LR-4 are open, allowing valve 26 to close. If the system is in a dump cycle, that is if oil is being transferred from chamber 13 to chamber 14, the operation of valve 26 is not effected until the next cycle during the time when relay 67 is unlatched to open contacts LR-4. With contacts BOR-2 already open, the valve reaches neutral or closed position immediately.

Oil is circulated continuously through pump 31 to treating equipment 29, preferably through only the dehydration and settling portions of the treating equipment.

If the level reaches detector 37 at any time, the entire operation ceases because lease shut-in valve 28 is closed by opening the circuit through LV, and light 69 so indicates. Similarly light 70 indicates when the lease is shutdown due to bad oil at the detector 41.

Figure 4:
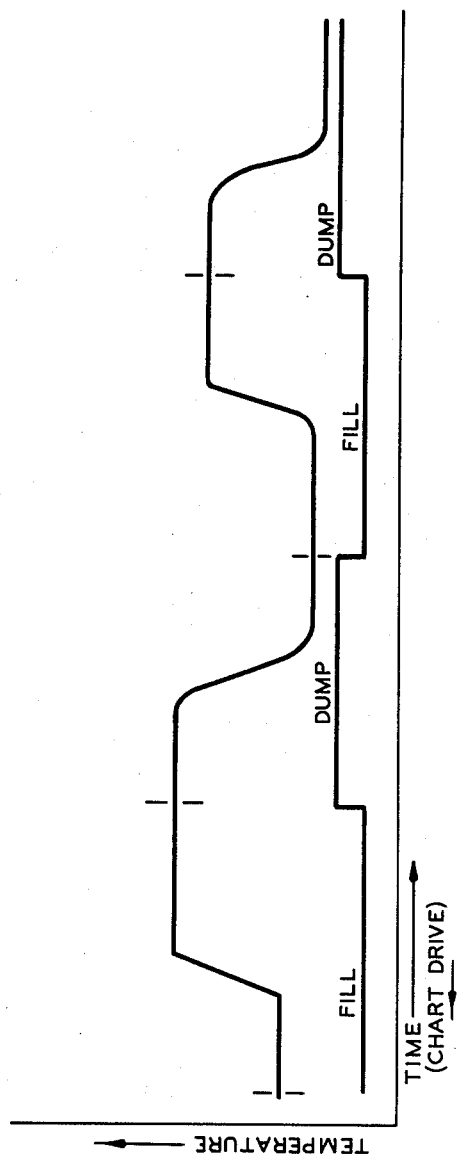
FIGURE 4 is a typical temperature recorder chart.

FIGURE 4 illustrates the trace of temperature which is recorded on chart 53. Normally the temperature recorded by probe 42 is near atmospheric. However, when the oil from the lease hits this probe normally it causes a rise in temperature as indicated by the fluctuations in the temperature curve in FIGURE 4. To determine the proper time at which to measure the temperature a separate pen on the chart is actuated by the actuating circuit for valve 26 to switch from a lower to a higher position and indicate the fill and dump cycle as shown in FIGURE 4. Thus the point at which the temperature is measured in calculations for volume corrections is the beginning of the dump cycle. Where several dumps have been made, averages can be calculated. In a large field operation a temperature integrating system is used so that the total counts recorded by an analog to digital convertor can be made to represent the sum of the temperatures measured in a single calculation, that is a division of this number by the number of dumps, together with a suitable correction factor used if necessary by the nature of the analog to digital computer.

A suitable temperature integrating system is disclosed and claimed in copending application Serial No. 93,268, L. E. Kuntz, filed March 3, 1961, now Patent No. 3,101,-613 granted August 27, 1963.

The description of the operation and the apparatus has been simplified by the elimination of items of equipment and operation which can be supplied by one skilled in the art. For example suitable terminals, fuses, circuit breakers, etc., have been eliminated from the electrical circuit. Similarly, valves, additional apparatus of lease production, details of construction of the apparatus etc., have been eliminated or shown schematically. The various valves which are operated by the electrical circuit can be solenoid or electric motor driven valves operated directly by the circuit, or can be air or hydraulic valves actuated by solenoid valves in the pressure supply system. Similarly the motors can be actuated directly by the contacts in the circuit or can be actuated by separate relay or starter circuits.

Reasonable variation and modification are possible within the scope of my invention which sets forth a method and apparatus for fluid metering and custody transfer, utilizing a single transfer zone, which greatly simplifies interlocks.

I claim:

1. A method for metering and transferring custody of a fluid, which comprises the steps of:

flowing said fluid from a source of supply into an accumulation zone;

providing a first communication path from said accumulation zone at a level substantially above the bottom thereof through first and second openings of a transfer zone and flowing said fluid by gravity through said first path from said accumulation zone into a metering zone at a lower level;

continuing flow of said fluid from said accumulation zone into said metering zone to fill said metering zone;

closing said first path and providing a second communication path through said second opening and a third opening of said transfer zone when said fluid reaches a predetermined level defining the upper boundary of said metering zone, and flowing said fluid by gravity through said second path from said metering zone into a custody transfer zone at a lower level;

beginning transfer of said fluid from said custody transfer zone when said liquid reaches a predetermined level therein;

continuing transfer of said fluid from said custody transfer zone until said metering zone is empty;

closing said second path and opening said first path when the level of said liquid falls below a predetermined level in said custody transfer zone when said metering zone is empty;

continuously monitoring said fluid in said accumulation zone for the water content thereof at a level near the bottom of said accumulation zone; and closing said first and second flow paths when said water content reaches a predetermined value.

2. Means for metering and transferring custody of a fluid comprising, in combination:

a fluid accumulation chamber;

a fluid metering chamber at a lower level than said accumulation chamber;

a fluid custody transfer chamber at a lower level than said metering chamber;

a three-way valve;

a first conduit connecting said accumulation chamber with a first opening of said valve;

a second conduit connecting said metering chamber with a second opening of said valve;

a third conduit connecting said custody transfer chamber with a third opening of said valve;

first valve actuating means to actuate said valve said valve to connect said first and second openings to provide a first flow path therethrough and maintain said third opening out of communication with said first and second openings;

second valve actuating means to actuate said valve to connect said second and third openings to provide a second flow path therethrough and maintain said first opening out of communication with said second and third openings;

first liquid level sensitive means to actuate said first valve actuating means when said fluid reaches a level defining the upper boundary of said metering chamber;

second liquid level sensitive means near the lower boundary of said metering chamber; and third liquid level sensitive means in said custody transfer chamber to actuate means to move said liquid from said custody transfer chamber and to actuate said first valve actuating means when the level of said liquid falls below said third liquid level sensitive means while said first and second liquid level sensitive means are not covered by said fluid.

3. Means for metering and transferring custody of a fluid, comprising in combination:
a lease automatic custody transfer and metering tank comprising:
a fluid accumulation chamber in the upper portion thereof,
a fluid metering chamber in an intermediate portion thereof at a lower level than said accumulation chamber, and
a fluid custody transfer chamber in a lower portion thereof at a lower level than said metering chamber;
a three-way valve comprising:
two internal ports controlling separate flow paths therethrough,
an actuating rod, a pair of valve discs slidably retained on said rod and resiliently urged in opposite directions thereon away from each other,
said discs being positioned in the space between said ports, whereby both of said ports are closed when no force is applied to said rod,
an actuating diaphragm attached to said rod,
means to apply pressure fluid above said diaphragm and means to apply pressure fluid beneath said diaphragm whereby when pressure is applied above said diaphragm one of said ports is open and the other closed, and when pressure is applied below said diaphragm the other of said ports is opened and said one of said ports is closed, and when pressure is released above and below said diaphragm both of said ports are closed, and
three outlet openings, communication between one of said openings and a second of said openings being controlled by one of said valve discs and communication between said second of said openings and a third of said openings being controlled by a second of said valve discs.
a first conduit connecting said accumulation chamber at a level substantially above the bottom thereof with said one of said openings of said valve;
a second conduit connecting said metering chamber with said second opening of said valve;
a third conduit connecting said custody transfer chamber with said third opening of said valve;
first valve actuating means to actuate said valve to connect said first and second openings to provide a first flow path therethrough and maintain said third opening out of communication with said first and second openings;
second valve actuating means to actuate said valve to connect said second and third openings to provide a second flow path therethrough and maintain said first opening out of communication with said second and third openings;
first liquid level sensitive means to actuate said first valve actuating means when said fluid reaches a level defining the upper boundary of said metering chamber;
second liquid level sensitive means near the lower boundary of said metering chamber;
third liquid level sensitive means in said custody transfer chamber to actuate means to move said liquid from said custody transfer chamber and to actuate said first valve actuating means when the level of said liquid falls below said third liquid level sensitive means while said first and second liquid level sensitive means are not covered by said fluid; and
means to monitor the water content of said fluid in said accumulation zone continuously at a level near the bottom thereof and to close said first and second flow paths when said water content reaches a predetermined value.

4. Means for metering and transferring custody of a fluid, comprising in combination:
a lease automatic custody transfer and metering tank comprising:
a fluid accumulation chamber in the upper portion thereof;
a fluid metering chamber in an intermediate portion thereof at a lower level than said accumulation chamber, and
a fluid custody transfer chamber in a lower portion thereof at a lower level than said metering chamber;
a three-way valve comprising:
two internal ports controlling separate flow paths therethrough,
an actuating rod, a pair of valve discs slidably retained on said rod and resiliently urged in opposite directions thereon away from each other,
said discs being positioned in the space between said ports, whereby both of said ports are closed when no force is applied to said rod,
an actuating diaphragm attached to said rod,
means to apply pressure fluid above said diaphragm and means to apply pressure fluid beneath said diaphragm whereby when pressure is applied above said diaphragm one of said ports is open and the other closed, and when pressure is applied below said diaphragm the other of said ports is opened and one of said ports is closed, and when pressure is released above and below said diaphragm both of said ports are closed, and
three outlet openings, communication with one of said openings and a second of said openings being controlled by one of said valve discs and communication between said second of said openings and a third of said openings being controlled by a second of said valve discs;
a first conduit connecting with said accumulation chamber at a level substantially above the bottom thereof with said first opening of said valve;
a second conduit connecting said metering chamber with said second opening of said valve;
a third conduit connecting said custody transfer chamber with said third opening of said valve;
first valve actuating means to actuate said valve to connect said first and second openings to provide a first flow path therethrough and maintain said third opening out of communication with said first and second openings;
second valve actuating means to actuate said valve to connect said second and third openings to provide a second flow path therethrough and maintain said first out of communication with said second and third openings;
first liquid level sensing means positioned in said third conduit above the top of said metering chamber and above the level at which said first conduit communicates with said accumulation chamber to actuate said first valve actuating means when said fluid reaches the level of said first liquid level sensitive means which level defines the upper boundary of a metering zone;
second liquid level sensitive means positioned in said third conduit below the lower boundary of said metering chamber, the level of said second liquid level sensitive means defining the lower boundary of said metering zone;
third liquid level sensitive means in said custody transfer chamber to actuate means to move said liquid from said custody transfer chamber and to actuate said first valve actuating means when the level of said liquid falls below said third liquid level sensitive means while said first and second liquid level sensitive means are not covered by said fluid; and means to monitor the water content of said fluid in said accumulation zone continuouly at a level near the bottom thereof and to discontinue the application of pressure to said diaphragm and to close said first and second flow paths when said water content reaches a predetermined value.

References Cited by the Examiner

UNITED STATES PATENTS

| | | | |
|---|---|---|---|
| 1,114,360 | 10/14 | Hornung | 73—224 |
| 1,766,262 | 6/30 | Simmons | 137—391 |
| 2,831,350 | 4/58 | Banks | 73—224 XR |
| 2,882,724 | 4/59 | Smith | 73—224 XR |
| 2,882,914 | 4/59 | Wiley | 137—2 |
| 2,936,622 | 5/60 | Glasgow | 73—224 |
| 2,956,581 | 10/60 | Pearson | 137—391 |
| 2,995,139 | 8/61 | Remke | 137—2 |
| 3,101,614 | 8/63 | Hubby | 73—224 |

ISADOR WEIL, *Primary Examiner.*